Sept. 11, 1934.                H. D. CHURCH                1,973,332
                          TRANSMISSION MECHANISM
                           Filed June 24, 1929          4 Sheets-Sheet 1
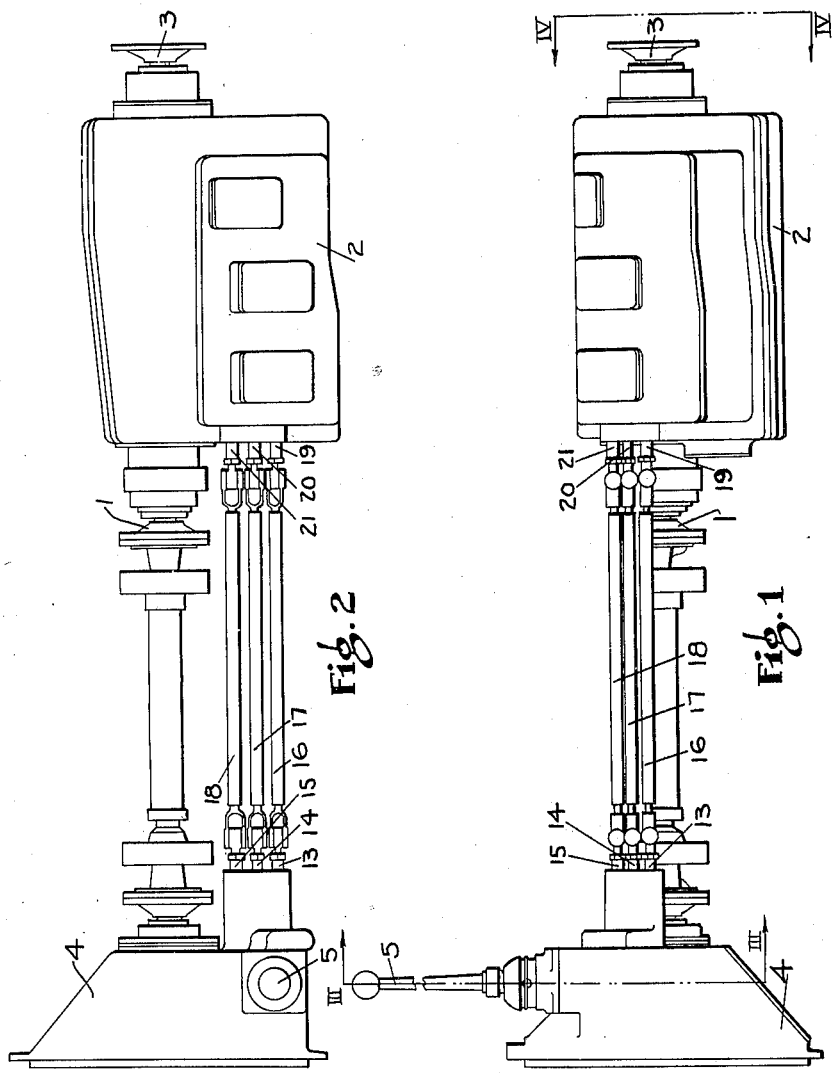
INVENTOR.
Harold D. Church
BY
Harvey R. Hawgood
ATTORNEY.

Sept. 11, 1934.     H. D. CHURCH     1,973,332
TRANSMISSION MECHANISM
Filed June 24, 1929     4 Sheets-Sheet 2

Harold D. Church INVENTOR.
BY Harvey R. Hawgood
ATTORNEY.

Sept. 11, 1934.  H. D. CHURCH  1,973,332
TRANSMISSION MECHANISM
Filed June 24, 1929   4 Sheets-Sheet 4

INVENTOR.
Harold D. Church
BY Harvey R. Hauger
ATTORNEY.

Patented Sept. 11, 1934

1,973,332

UNITED STATES PATENT OFFICE 1,973,332

TRANSMISSION MECHANISM

Harold D. Church, Cleveland, Ohio, assignor to The White Motor Company, Cleveland, Ohio, a corporation of Ohio Application June 24, 1929, Serial No. 373,089

2 Claims. (Cl. 74—59)

This invention relates to power transmission means and is particularly adapted to the transmissions of automotive vehicles.

An object of the invention is to provide an improved gearing for transmitting power with which a large number of gear ratios may be effected and which will occupy relatively little space.

Another object is to provide an improved transmission mechanism in which the gears may be arranged for relatively large number of speeds and in which the shifting of the gears and selecting of speeds is easily effected.

Another object is to provide a transmission mechanism contained within a gear case, the case of which may be efficiently stiffened and reinforced without increasing the overall dimensions thereof.

Other objects will hereinafter appear.

The invention will be better understood from the description of one practical embodiment thereof illustrated in the accompanying drawings, in which;

Figure 1 is a side elevational view of an automobile transmission embodying the invention, together with the gear shifting lever and associated mechanism;

Figure 2 is a plan view thereof;

Figure 3:
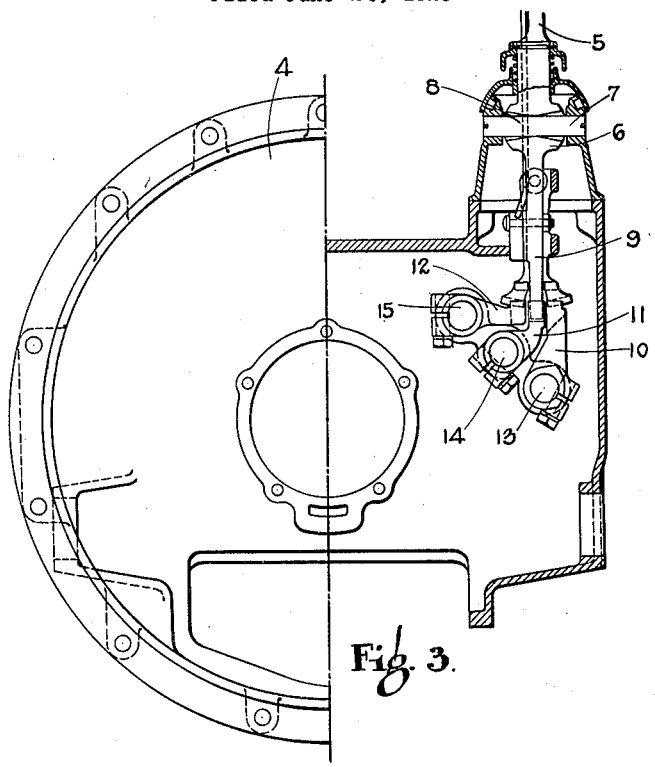
Figure 3 is an end elevation showing the forward end of the transmissions of Figures 1 and 2.
Figure 4:
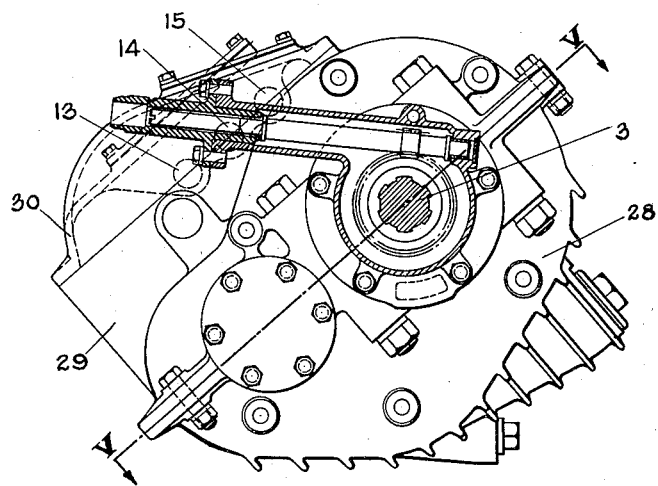
Figure 4 is a rear end elevation of the transmission of the above figures.
Figure 5:
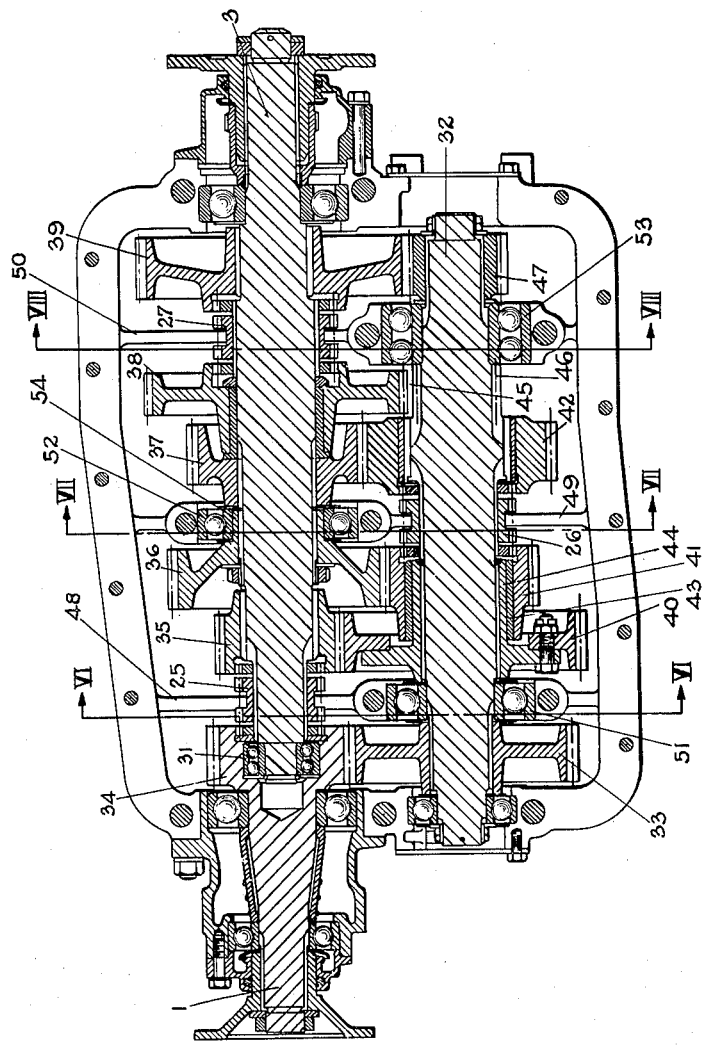
Figure 5 is a view of the gearing within the casing taken on the line V—V of Figure 4.
Figure 6:
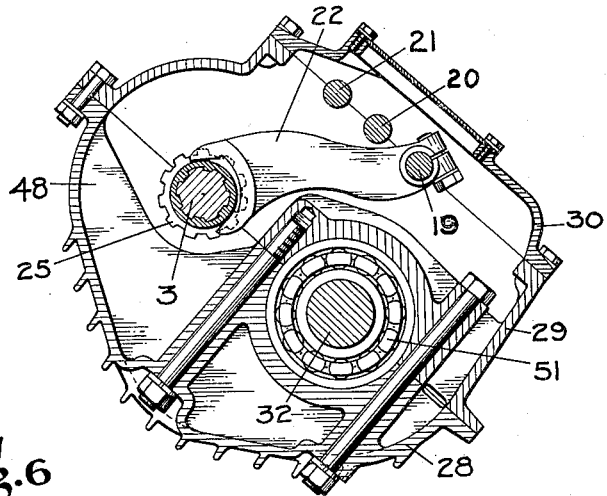
Figures 6, 7 and 8 are transverse sectional views of the transmission of the above figures taken on lines VI—VI, VII—VII and VIII—VIII, respectively, of Figure 5.
Figure 7:
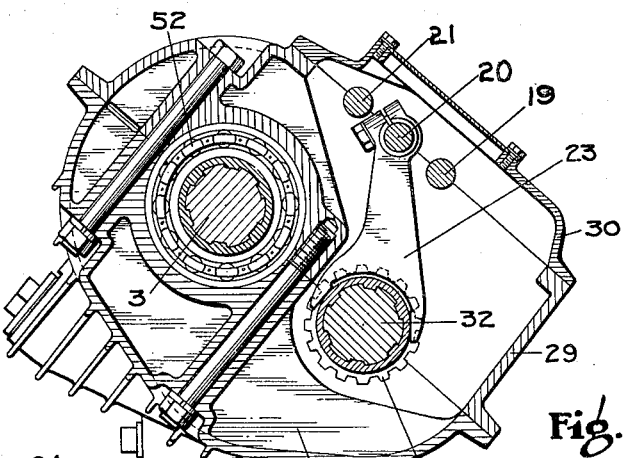
Figure 8:
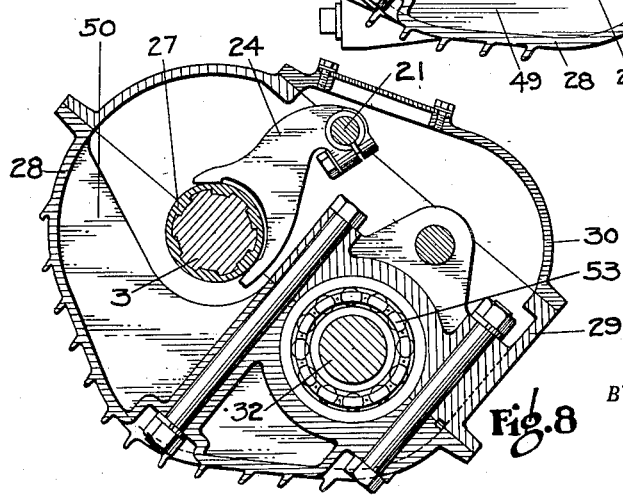

The apparatus shown comprises the end of a drive shaft 1 from a prime mover such as in an internal combustion motor (not shown) which operates through transmission mechanism contained in a housing indicated generally at 2, a driven or propeller shaft 3 extending therefrom.

Carried upon the rear end 4 of the crank case of the motor is the gear shifting mechanism which comprises a hand lever 5 pivoted by means of a ball and socket connection 6 to the crank case, the rotation of the lever being prevented by a pin 7 passing through a slot 8 in the ball part of the lever. The lower end 9 of the lever is selectively engageable with slots in arms 10, 11 and 12 secured, respectively, to three rods 13, 14 and 15, longitudinally slidable within the crank case and connected by universal joints and links 16, 17 and 18 to three rods 19, 20 and 21, longitudinally slidable within the upper part of the transmission housing. These rods carry yokes 22, 23 and 24, and so actuate clutches 25, 26 and 27 which control the drive through the transmission.

The transmission housing comprises a lower or main casing section 28 upon which is secured an upper casing section 29 having an open top enclosed by cover 30. The three rods 19, 20 and 21 are supported in bearings, formed between the upper half of the housing and the cover, in which they may slide longitudinally.

The drive shaft and propeller shaft enter in axial alinement in the plane between the lower and upper parts of the housing, the end of the latter being supported as by a ball bearing 31 within the end of the former.

Parallel to these shafts is a back shaft 32 also with its axis in the plane between the upper and lower sections of the housing, its forward end being provided with a gear 33, keyed to it and engaging a gear 34, formed integral with the end of the drive shaft.

The propeller shaft has rotatably mounted upon it, adjacent its forward end, a gear 35 which is succeeded by gears 36 and 37 permanently keyed to the shaft, and then by gears 38 and 39 rotatable upon the shaft. Clutch 25 is interposed between the gear 34 and gear 35 and is slidably feathered to the propeller shaft so that by engagement of clutch 25 with the former gear (34) the drive shaft and propeller shaft are directly engaged to rotate at the same speed, and, by this clutch being moved backwardly, gear 35 is connected to the propeller shaft to drive the same, this being in turn driven by a gear 40 carried by the back shaft and permanently keyed thereto.

Two gears 41 and 42, in engagement respectively with gears 36 and 37 on the propeller shaft, are rotatably mounted upon the back shaft and either may be connected thereto by clutch 26 slidable between them. Gear 41 is not directly carried by the back shaft but rotates upon a bushing 43 on the extended hub 44 of gear 40, thus decreasing the length of back shaft necessary for supporting these two gears.

Gear 38 upon the propeller shaft is constantly in mesh with an idler gear 45 driven through gear 46 upon the back shaft, so that when clutch 27 is operated to clutch the gear to the propeller shaft, this shaft is driven in a reverse direction from that in which it is driven by the other gears and so provides the reverse speed for the vehicle. A gear 47 is permanently keyed to the end of the back shaft and meshes with gear 39 so that it will drive the propeller shaft when clutch 27 is engaged with the latter.

Three webs 48, 49 and 50 extend transversely across the interior of the bottom section of the housing, passing beneath the three clutches carried by the propeller and back shafts, and each web is provided with a bearing (51, 52 and 53 respectively) for the shaft which does not have a clutch at this point, so that each shaft is supported at a plurality of spaced points while the complete assembly is not lengthened to provide room for the bearings. A further economy in length is effected by having bearing 52 surround the hub 54 of gear 36. The bearings and webs are, therefore, all placed in space which is unavailable for gears or clutches and the resultant transmission is much more compact than prior transmissions having the same number of gear combinations.

The different speeds are attained as follows: When the upper end of gear shift lever 5 is moved to the operator's left to engage the notch in arm 12, clutch 27 may be operated in either direction. When the gear shift lever in this position is moved forward, clutch 27 is engaged with gear 39, and the drive is from drive shaft 1, through gear 34 to gear 33 upon the back shaft, thence through gears 47 and 39 to the propeller shaft, this being the first or lowest speed of the transmission.

When the handle of the lever 5 is moved back from this position, the clutch is caused to engage the gear 38 and the drive now passes through the back shaft, through gear 46, idler 45, and gear 38 to the propeller shaft, this being the reverse speed.

If now the lever is moved to its central or neutral position, the clutch is disengaged from both gears, and if the lever is moved laterally to its intermediate position so that it engages the notch in arm 11 carried by rod 14, clutch 26 will be operated. If the lever handle is now moved forward, clutch 26 will engage the gear 42, the drive passing through the drive shaft and back shaft, through gears 42 and 37 to the propeller shaft and being the third speed of the transmission. If the lever handle is moved directly to the rear, gear 41 is engaged by the clutch, this driving gear 36 and providing the second speed of the transmission.

If now the handle of the lever be moved to an extreme right by the operator, the end 9 will engage the arm 10 on rod 13 and will therefore actuate clutch 25, the forward movement of the lever handle causing this clutch to connect gear 35 to the propeller shaft so that the drive is through the drive shaft to the back shaft, through gears 40 and 35, this being the fifth speed of the transmission. If, with the lever at the extreme right this is moved to the rear, clutch 25 couples the ends of the drive and propeller shafts, so that these operate directly, thus constituting the fourth speed of the transmission.

From the above it will be seen that the gear shift is very simply operated, the different speeds being arranged in an orderly relation to each other, that is the reverse and first speeds are on one rod, second and third on the next, and fourth and fifth on the last rod, so that the operator may readily select any speed and operate the clutches to obtain this speed in moving the lever from any other arrangement.

While I have described the illustrated embodiment of my invention in some particularity, obviously many others will readily occur to those skilled in the art, and I do not, therefore, limit myself to the precise details shown and described, but claim as my invention all variations, modifications and embodiments thereof coming within the scope of the appended claims.

I claim:

1. Transmission mechanism comprising a casing, a drive shaft extending into said casing terminating in a gear and a bearing, a propeller shaft extending into said casing in axial alinement with said drive shaft and journaled in said bearing, a back shaft parallel to said drive and propeller shafts journaled in said casing and having a gear at one end in mesh with the gear on the drive shaft, a gear upon the propeller shaft adjacent its end and meshing with a gear keyed to the back shaft, a clutch splined to the propeller shaft and engageable selectively with the gear upon said shaft and with the end of the drive shaft, two gears fixed to the propeller shaft in mesh with two gears rotatable upon the back shaft, a clutch between said last mentioned gears and operable to connect either with said back shaft, two gears fixed to said back shaft, one of which meshes with a gear rotatably carried by the propeller shaft and the other of which meshes with an idler meshing with a gear rotatably carried by the propeller shaft, a clutch between said last mentioned gears upon said propeller shaft and operable to selectively connect either of them to it, and three transverse webs across the interior of said housing in alinement with said clutches, each web being cut away in the vicinity of the clutch and provided with a bearing supporting the shaft not provided at this point with a clutch.

2. Transmission mechanism comprising a housing, a drive shaft, a driven shaft, and a back shaft therein, gearing carried by said shafts, a clutch carried by one of said shafts to connect parts of said gearing thereto, a transverse web passing beneath the drive shaft and back shaft, and relieved in the vicinity of said clutch, and a bearing carried by said web in alinement with the clutch, and supporting one of said shafts.

HAROLD D. CHURCH.